US010673754B2

(12) United States Patent
Choi et al.

(10) Patent No.: US 10,673,754 B2
(45) Date of Patent: *Jun. 2, 2020

(54) UPLINK MULTI-USER MULTIPLE-INPUT AND MULTIPLE-OUTPUT (UL MU-MIMO) TRANSMISSION REQUEST METHOD IN UL MU-MIMO COMMUNICATION

(71) Applicant: ELECTRONICS AND TELECOMMUNICATIONS RESEARCH INSTITUTE, Daejeon (KR)

(72) Inventors: Jee Yon Choi, Daejeon (KR); Jae Woo Park, Daejeon (KR); Hyoung Jin Kwon, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,318

(22) Filed: Jun. 29, 2018

(65) Prior Publication Data
US 2018/0309674 A1  Oct. 25, 2018

Related U.S. Application Data

(63) Continuation of application No. 15/247,479, filed on Aug. 25, 2016, now Pat. No. 10,038,635, which is a
(Continued)

(30) Foreign Application Priority Data

| Jul. 15, 2013 | (KR) | 10-2013-0082771 |
| Sep. 23, 2013 | (KR) | 10-2013-0112573 |
| Feb. 7, 2014 | (KR) | 10-2014-0013949 |

(51) Int. Cl.
*H04W 4/00* (2018.01)
*H04L 12/741* (2013.01)
(Continued)

(52) U.S. Cl.
CPC ............ *H04L 45/74* (2013.01); *H04B 7/0452* (2013.01); *H04B 7/0617* (2013.01); *H04W 72/0413* (2013.01); *H04W 88/08* (2013.01)

(58) Field of Classification Search
CPC ........ H04B 7/024; H04B 7/04; H04B 7/0413; H04B 7/0417; H04B 7/0452;
(Continued)

(56) References Cited

U.S. PATENT DOCUMENTS 8,520,616 B2 * 8/2013 Cui ................... H04L 5/0035
370/329
8,768,393 B2 * 7/2014 Shirani-Mehr ..... H04W 72/048
370/252

(Continued)

FOREIGN PATENT DOCUMENTS

KR 20070033287 A 3/2007

OTHER PUBLICATIONS

Tandai et al, An efficient uplink Multiuser MIMO protocol in IEEE 802.11 WLANs, IEEE, 5 pages, 2009.*

*Primary Examiner* — Frank Duong

(57) ABSTRACT

Provided is a method of transmitting and receiving a frame for a multi-user multiple-input and multiple-output (MU-MIMO) communication in an access point (AP), the method including transmitting, to each of a plurality of stations (STAs), an uplink multi-user request (UL MU request) frame requesting transmission of a data frame, and receiving, from each of the plurality of STAs, the data frame during an identical period of time based on an identical reception intensity, wherein the UL MU request frame includes at least
(Continued)

one of information on a transmission time of the data frame and information on a reception intensity of the data frame in the AP.

14 Claims, 9 Drawing Sheets

Related U.S. Application Data continuation of application No. 14/329,874, filed on Jul. 11, 2014, now Pat. No. 9,455,773.

(51) Int. Cl.
*H04B 7/0452* (2017.01)
*H04B 7/06* (2006.01)
*H04W 72/04* (2009.01)
*H04W 88/08* (2009.01)

(58) Field of Classification Search
CPC ...... H04B 7/0495; H04B 7/06; H04B 7/0617; H04L 5/0005; H04L 5/0007; H04L 12/741; H04L 27/2626; H04L 27/2627; H04L 27/2634; H04L 27/2636; H04L 27/2637; H04L 27/2646; H04L 45/74; H04W 72/04; H04W 72/0413; H04W 88/08

See application file for complete search history.

(56) References Cited

U.S. PATENT DOCUMENTS

| | | | |
|---|---|---|---|
| 9,338,789 B2* | 5/2016 | Wang | H04W 72/0413 |
| 9,729,367 B2* | 8/2017 | Sohn | H04W 74/002 |
| 2010/0220679 A1 | 9/2010 | Abraham et al. | |
| 2010/0329236 A1* | 12/2010 | Sampath | H04W 56/0005 370/350 |
| 2013/0170427 A1* | 7/2013 | Gong | H04B 7/0408 370/312 |

* cited by examiner

FIG. 5B

| L-STF | L-LTF | L-SIG | VHT-SIG-A | VHT-STF | VHT-LTF | VHT-SIG-B | Data |

UPLINK MULTI-USER MULTIPLE-INPUT AND MULTIPLE-OUTPUT (UL MU-MIMO) TRANSMISSION REQUEST METHOD IN UL MU-MIMO COMMUNICATION

CROSS-REFERENCE TO RELATED APPLICATION

This application is a continuation of U.S. patent application Ser. No. 15/247,479 filed Aug. 25, 2016, which is a continuation of U.S. patent application Ser. No. 14/329,874 filed on Jul. 11, 2014, now U.S. Pat. No. 9,455,773 issued Sep. 27, 2016, which claims the priority benefit of Korean Patent Application No. 10-2013-0082771, filed on Jul. 15, 2013, Korean Patent Application No. 10-2013-0112573 filed on Sep. 23, 2013, and Korean Patent Application No. 10-2014-0013949 filed on Feb. 7, 2014 in the Korean Intellectual Property Office, the disclosures of which are incorporated herein by reference.

BACKGROUND

1. Field of the Invention

Embodiments of the present invention relate to a media access control (MAC) protocol of a wireless local area network (WLAN), and more particularly, to a configuration of a frame for use in frame transmission based on uplink multi-user multiple-input and multiple-output (UL MU-MIMO) technology.

2. Description of the Related Art

Recently, in wireless communication systems, a multiple-input and multiple-output (MIMO) technology for transmitting and receiving data using at least two antennas is being generalized. A wireless local area network (WLAN) also enables at least two transmission antennas to be used from the Institute of Electrical and Electronics Engineers (IEEE) 802.11n standard. The IEEE 802.11n standard allows for use of up to four antennas, and the IEEE 802.11ac standard allows for use of up to eight antennas. For example, in a case of using a great number of transmission antennas, data transmission may be performed based on transmit beam-forming technology, thereby improving a performance of signal reception.

For efficient use of frequency resources, the IEEE 802.11ac for which standardization is in progress may include downlink multi-user multiple-input and multiple-output (MU-MIMO) technology enabling an access point (AP) to simultaneously transmit beamformed data frames to a plurality of stations (STAs). Also, research is being conducted into uplink (UL) MU-MIMO technology enabling transmission of data frames to the AP from the plurality of STAs and reception of the data frames at the AP through being separated for each stream, to be conducted simultaneously.

FIG. 1 is a diagram illustrating an example of a protocol used to transmit data based on UL MU-MIMO technology according to a related art.

Since stations (STAs) transmitting data based on the UL MU-MIMO communication are to simultaneously transmit beamformed data frames, an AP may need to perform a process of providing notification on a time at which a transmission is initiated. The process may correspond to a UL MU request sequence of FIG. 1. When the process ends, the STAs may transmit the beamformed data frames after a predetermined period of time elapses. When the beamformed data frames are received from the STAs, the AP may transmit, to each of the STAs, an acknowledgement (ACK) frame or a block ACK (BA) frame which corresponds to an ACK sequence of FIG. 1. Depending on a necessity, a protection sequence for preventing channel accesses of other STAs included in a basic service set (BSS) may be performed before the UL MU request sequence.

To successfully receive the beamformed data frames simultaneously transmitted from the STAs to the AP, a temporal length, for example, a transmission time of the beamformed data frame transmitted by each of the STAs may need to be the same, an intensity of a received signal may need to be almost the same, and a number of spatial streams (Nss) used for a transmission of each of the STAs may need to be acknowledged.

SUMMARY

According to an aspect of the present invention, there is provided a method of transmitting and receiving a frame for a multi-user multiple-input and multiple-output (MU-MIMO) communication in an access point (AP), the method including transmitting, to each of a plurality of stations (STAs), an uplink multi-user request (UL MU request) frame requesting transmission of a data frame, and receiving, from each of the plurality of STAs, the data frame during an identical period of time based on an identical reception intensity, wherein the UL MU request frame includes at least one of information on a transmission time of the data frame and information on a reception intensity of the data frame in the AP.

The UL MU request frame may include identification information on each of the plurality of STAs, and the identification information may include at least one of media access control (MAC) address information, association identification (AID) information, and partial AID information in the Institute of Electrical and Electronics Engineers (IEEE) 802.11ac.

The UL MU request frame may further include information on a number of transmission STAs.

According to another aspect of the present invention, there is also provided a method of transmitting and receiving a frame for an MU-MIMO communication in an STA, the method including receiving, from an AP, a UL MU request frame requesting transmission of a data frame, determining a transmission time of the data frame based on the UL MU request frame, and transmitting, to the AP, the data frame during the determined transmission time, wherein the UL MU request frame includes the transmission time of the data frame.

The UL MU request frame may include identification information on the STA, and the identification information may include at least one of MAC address information, AID information, and partial AID information in the IEEE 802.11ac.

According to still another aspect of the present invention, there is also provided a method of transmitting and receiving a frame for an MU-MIMO communication in an STA, the method including receiving, from an AP, a UL MU request frame requesting transmission of a data frame, determining a transmission intensity of the data frame based on the UL MU request frame, and transmitting, to the AP, the data frame based on the determined transmission intensity, wherein the UL MU request frame includes information on a reception intensity of the data frame in the AP.

The determining may include determining the transmission intensity of the data frame based on the information on the reception intensity of the data frame in the AP.

The UL MU request frame may further include information on a transmission intensity of the UL MU request frame in the AP.

The method may further include determining a reception intensity of the UL MU request frame in the STA.

The determining of the transmission intensity of the data frame may include calculating a path loss based on information on the transmission intensity of the UL MU request frame in the AP and the reception intensity of the UL MU request frame in the STA.

The determining of the transmission intensity of the data frame may include determining the transmission intensity of the data frame based on information on the reception intensity of the data frame in the AP and the path loss.

According to yet another aspect of the present invention, there is also provided an STA for use in an MU-MIMO communication, the STA including a communicator to receive, from an AP, a UL MU request frame requesting transmission of a data frame, and a controller to determine a transmission time of the data frame based on the UL MU request frame, and control the communicator to transmit the data frame to the AP during the determined transmission time, wherein the UL MU request frame includes the transmission time of the data frame.

The UL MU request frame may include identification information on the STA.

According to further another aspect of the present invention, there is also provided an STA for use in an MU-MIMO communication, the STA including a communicator to receive, from an AP, a UL MU request frame requesting transmission of a data frame, and a controller to determine a transmission intensity of the data frame based on the UL MU request frame, and control the communicator to transmit the data frame to the AP based on the determined transmission intensity, wherein the UL MU request frame includes information on a reception intensity of the data frame in the AP.

The controller may determine the transmission intensity of the data frame based on the information on the reception intensity of the data frame in the AP.

The UL MU request frame may further include information on a transmission intensity of the UL MU request frame in the AP.

The controller may determine a reception intensity of the UL MU request frame in the STA, and calculate a path loss based on information on the transmission intensity of the UL MU request frame in the AP and the reception intensity of the UL MU request frame in the STA.

The controller may determine the transmission intensity of the data frame based on information on the reception intensity of the data frame in the AP and the path loss.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5B is a diagram illustrating a configuration of a very high throughput (VHT) presentation protocol data unit (PPDU) according to an example embodiment;

DETAILED DESCRIPTION

Figure 1:
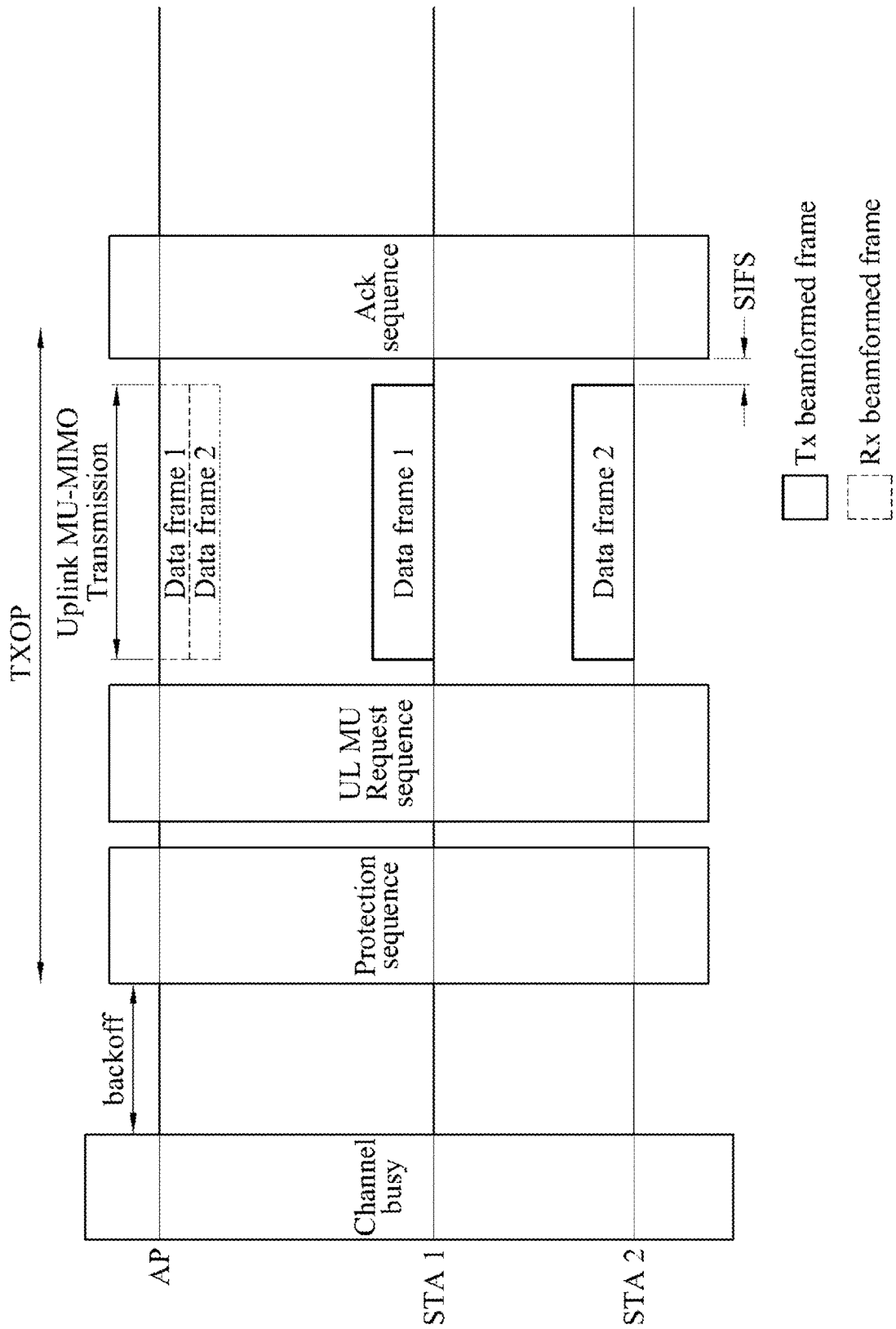
FIG. 1 is a diagram illustrating an example of a protocol used to transmit data based on uplink multi-user multiple-input and multiple-output (UL MU-MIMO) technology according to a related art.

Hereinafter, exemplary embodiments will be described in detail with reference to the accompanying drawings. However, it should be understood that these embodiments are not construed as limited thereto. Like reference numerals in the drawings denote like elements.

The terms used in this specification were selected to include current, widely-used, general terms, in consideration of the functions of the present invention. However, the terms may represent different meanings according to the intentions of the skilled person in the art or according to customary usage, the appearance of new technology, etc.

In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

Figure 2:
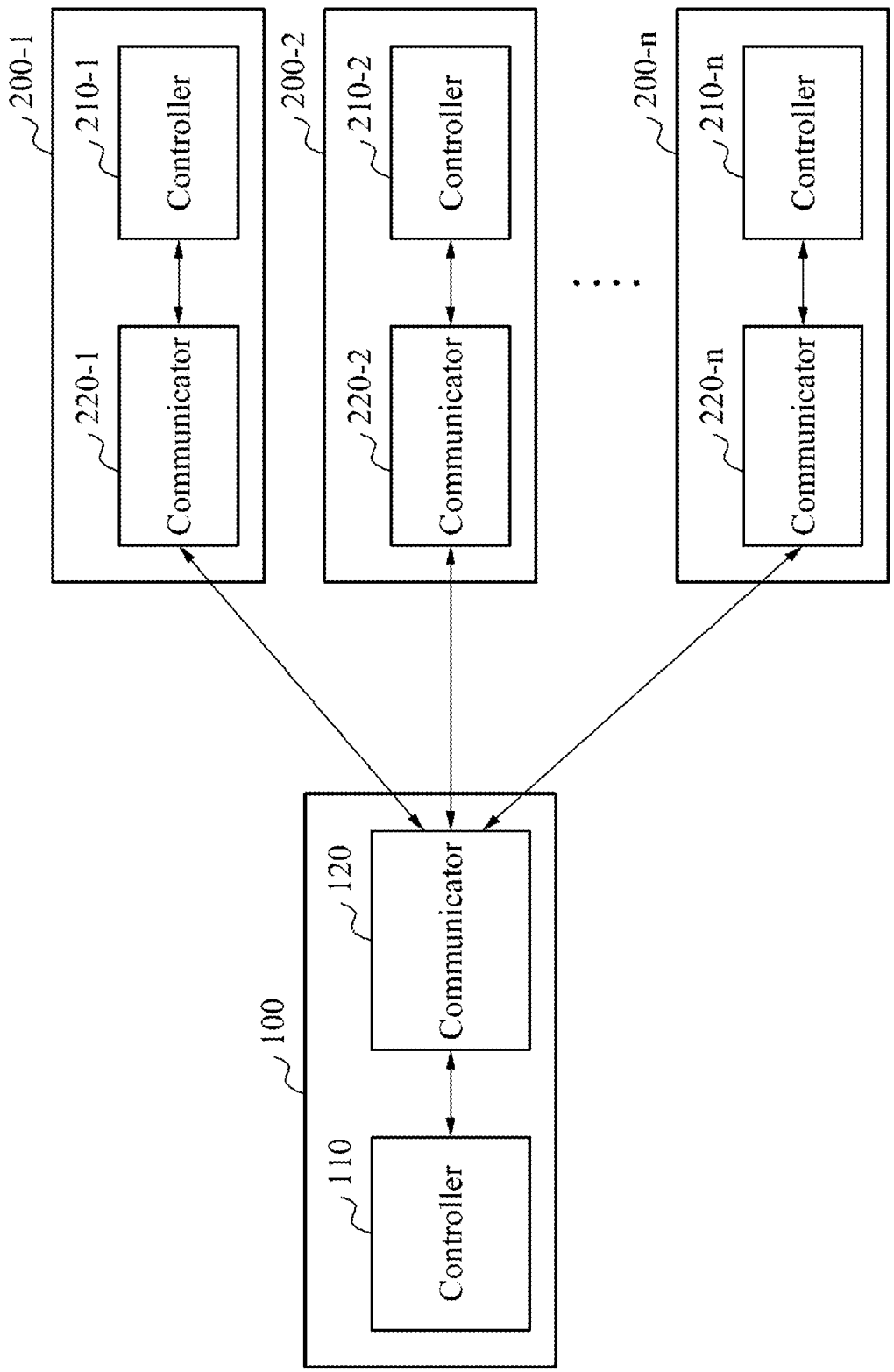
FIG. 2 is a block diagram illustrating an access point (AP) and stations (STAs) according to an example embodiment.

FIG. 2 is a block diagram illustrating an access point (AP) and stations (STAs) according to an example embodiment.

Referring to FIG. 2, an AP 100 may include a controller 110 and a communicator 120.

The controller 110 may generate a frame transmitted by the communicator 120. The controller 110 may process a frame received by the communicator 120. The controller 110 may control the communicator 120 to communicate with at least one of communicators 220-1 through 220-$n$ of STAs 200-1 through 200-$n$ based on a multiple-input and multiple-output (MIMO) scheme.

The controllers 210-1 through 210-$n$ may process frames received by the communicators 220-1 to 220-$n$, or generate frames transmitted by the communicators 220-1 through 220-$n$. The controllers 210-1 through 210-$n$ may determine one of a transmission time and a transmission intensity of a data frame based on, for example, an uplink multi-user request (UL MU request) frame. The controllers 210-1 through 210-$n$ may control the communicators 220-1 through 220-$n$ to transmit the data frame based on at least one of the determined transmission time and transmission intensity. In the present disclosure, the transmission time may refer to a period of time during which transmission is performed.

The controller 110 or each of the controllers 210-1 through 210-n may be implemented by, for example, an integrated circuit (IC) chip, a microprocessor, a minicomputer, and the like. The controller 110 or each of the controllers 210-1 through 210-n may determine, for example, an STA communicating with the communicator 120. The controller 110 or each of the controllers 210-1 through 210-n will be further explained with reference to the following descriptions.

The communicator 120 of the AP 100 may communicate with at least one of the communicators 220-1 through 220-n of the STAs 200-1 through 200-n. The communicator 120 of the AP 100 may transmit or receive the UL MU request frame and the data frame to or from at least one of the communicators 220-1 through 220-n of the STAs 200-1 through 200-n. The communicator 120 may include a communication module such as an antenna, a modulator/demodulator, a frequency processing device, a filtering device, and the like.

Figure 3:
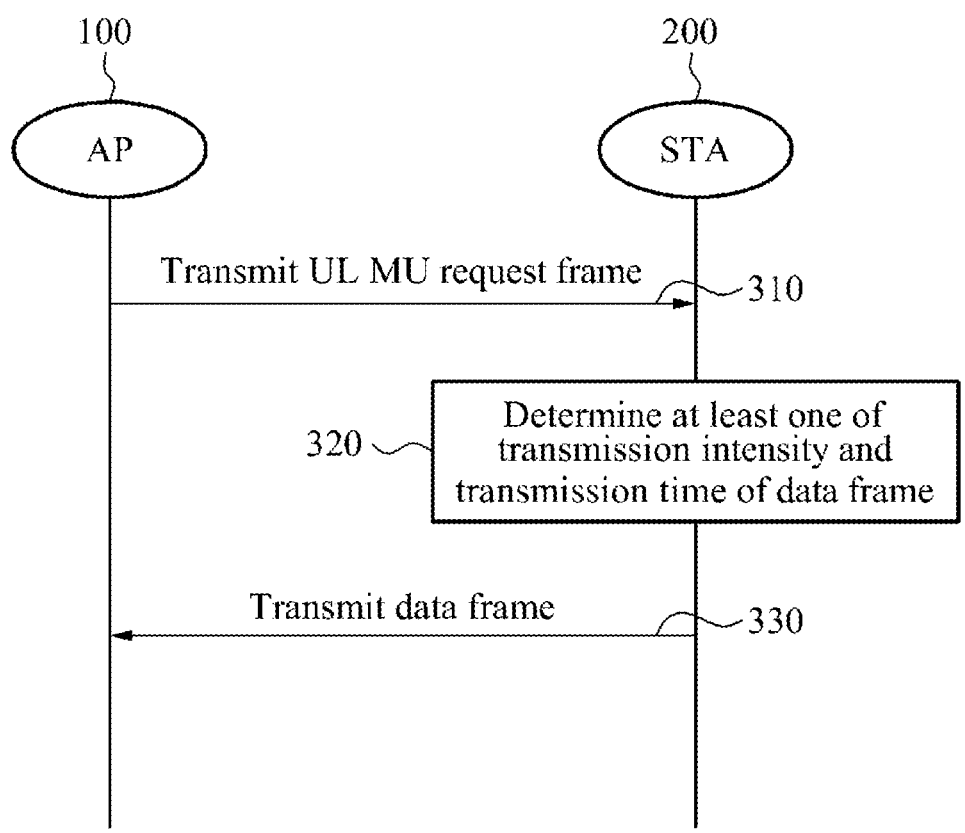
FIG. 3 is a timing diagram illustrating operations of an AP and an STA according to an example embodiment.

FIG. 3 is a timing diagram illustrating operations of an AP and an STA according to an example embodiment.

In operation 310, the AP 100 may transmit a UL MU request frame to an STA 200. The UL MU request frame may be a frame identifying a transmission STA and a frame instructing the transmission STA to transmit the data frame. The transmission STA may be preset to transmit the data frame after a predetermined period of time, for example, a short interframe space (SIFS), elapses in response to receiving the UL MU request frame. As another example, the AP 100 may perform a request to send/clear to send (RTS/CTS) exchange before transmitting the UL MU request frame. In an embodiment, the UL MU request frame may include at least one of information on a reception intensity and information on a transmission time of the data frame. For example, the UL MU request frame may include at least one of a reception intensity applied when the data frame is received in the AP 100 and a transmission intensity of the UL MU request frame of the AP 100.

In operation 320, the STA 200 may determine at least one of the transmission intensity and the transmission time of the data frame based on the UL MU request frame.

In operation 330, the STA 200 may transmit the data frame based on at least one of the determined transmission time and transmission intensity.

Figure 4:
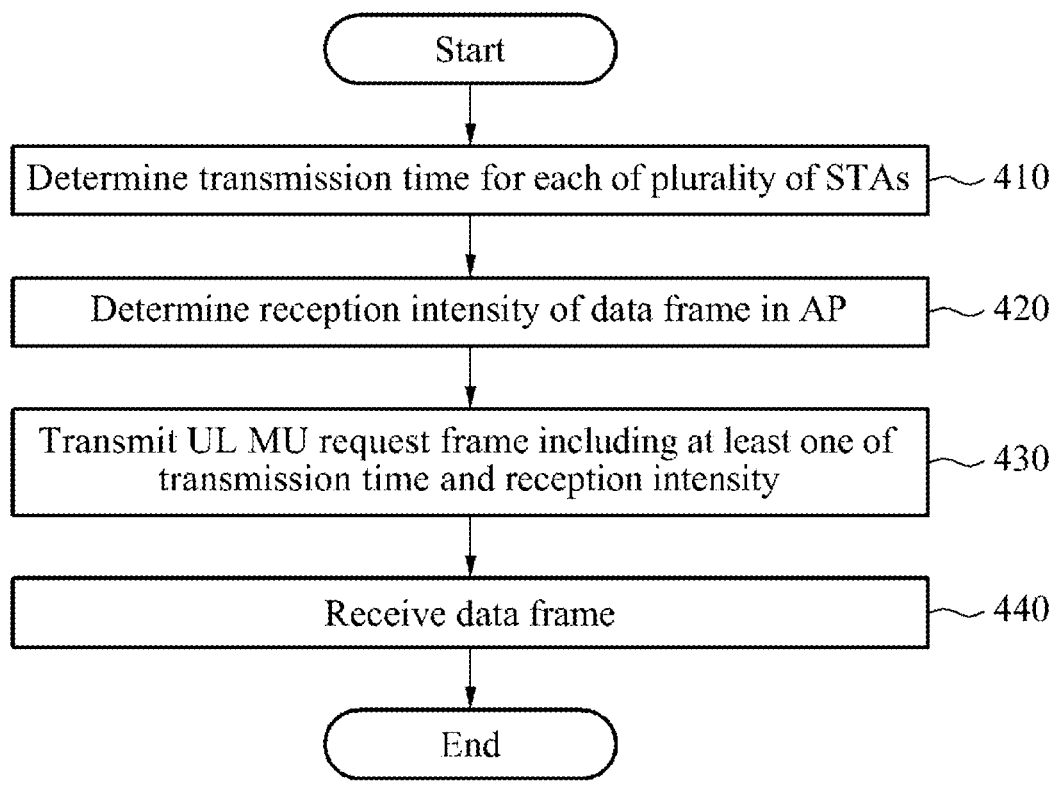
FIG. 4 is a flowchart illustrating a method of transmitting and receiving a frame in an AP according to an example embodiment.

FIG. 4 is a flowchart illustrating a method of transmitting and receiving a frame in an AP according to an example embodiment.

In operation 410, an AP may determine a transmission time for each of the plurality of STAs.

In operation 420, the AP may determine a reception intensity of the AP in a case in which each of the plurality of STAs transmits the data frame.

In operation 430, the AP may transmit, to an STA, the UL MU request frame including at least one of the determined transmission time and reception intensity. For example, a configuration of the UL MU request frame according to an example embodiment may be indicated with reference to FIG. 5A.

Figure 5A:
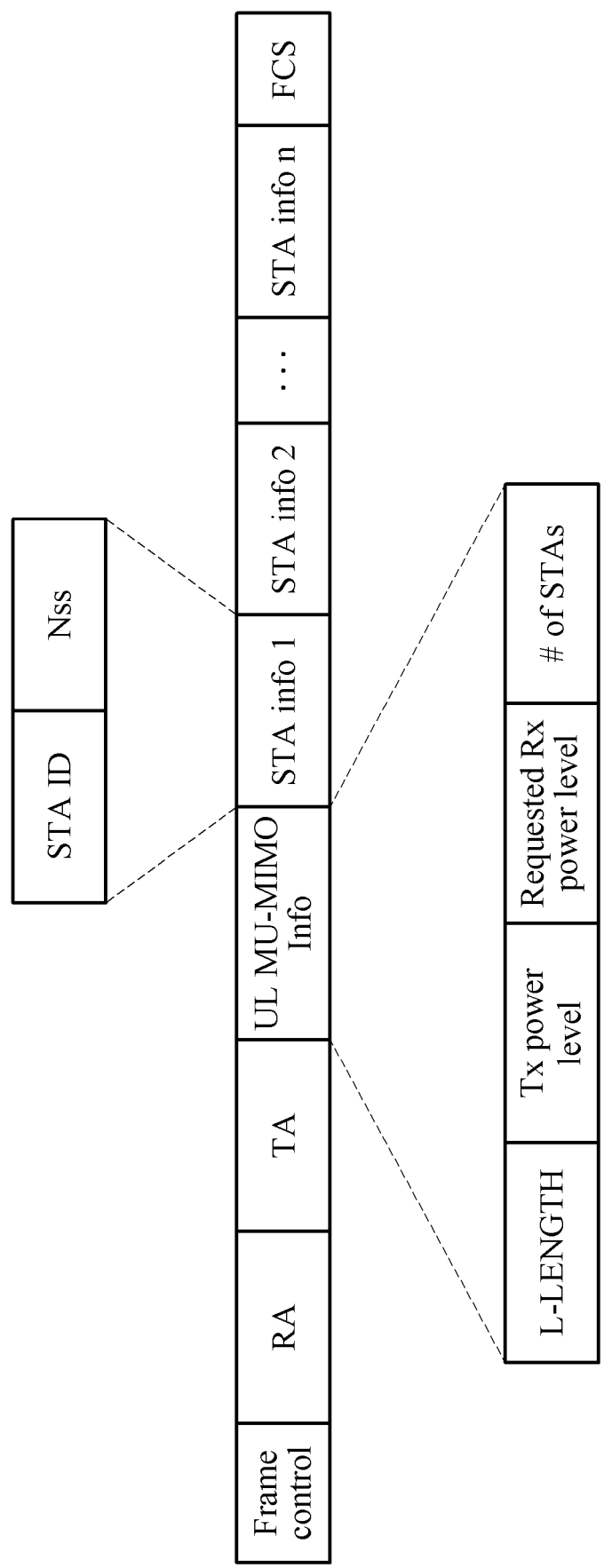
FIG. 5A is a diagram illustrating a configuration of a UL MU request frame according to an example embodiment.

Referring to FIG. 5A, the UL MU request frame may include a frame control field, a receiver address (RA) field, a transmitter address (TA) field, a UL MU-MIMO common information (UL MU-MIMO info) field, transmission STA information (STA info) fields, and a frame check sequence (FCS) field. The UL MU request frame may include the transmission STA fields, and include identification information on transmission STAs corresponding to STA1 through STAn. In an embodiment, the identification information on each of the transmission STAs may include at least one of media access control (MAC) address information, association identification (AID) information, and partial AID information in the Institute of Electrical and Electronics Engineers (IEEE) 802.11ac.

The UL MU-MIMO info field may include an L-LENGTH indicating a transmission time information field of the data frame, a Tx power level indicating an AP transmission intensity information field, a Requested Tx power level indicating a requested reception intensity information field, and a # of STAs indicating a field of information on a number of STAs.

The L-LENGTH may be used for a LENGTH value included in an L-SIG of a beamformed data frame to be transmitted by each of the STAs during a UL MU-MIMO transmission interval.

When a presentation protocol data unit (PPDU) type of the beamformed data frame is a high throughput (HT) PPDU or a very high throughput (VHT) PPDU, a LENGTH field of the L-SIG may be changed to a temporal length of a frame. Thus, when each of the STAs transmits the data frame, data of which an amount corresponds to the temporal length indicated in the L-LENGTH may be transmitted.

The Tx power level may include information on a transmission intensity applied when the AP transmits a UL MU request frame. The Requested Tx Rx power level may include information on a reception intensity requested when the AP receives a data frame.

The # of STAs may indicate the number of STAs to transmit data frames during the UL MU-MIMO transmission interval. The UL MU request frame may include STA info fields corresponding to the number indicated in the # of STAs.

In operation 440, the AP may receive the data frame. Each of the plurality of STAs may transmit the data frame to the AP during an identical period of time. The data frame transmitted by each of the plurality of STAs may be received by the AP based on an identical reception intensity. Here, "being identical" may be used to indicate an identicalness in terms of a time or an intensity, or being provided within a predetermined error range.

Among all preambles of physical (PHY) layers configuring PPDUs transmitted by the STAs based on UL MU-MIMO technology, each preamble corresponding to a portion of all preambles may need to be mutually equivalent so as to be received by the AP. A configuration of the VHT PPDU may be indicated with reference to FIG. 5B. In the configuration, each of a frame information field, for example, L-SIG, VHT-signal (SIG)-A, and VHT-SIG-B may include PHY layer control information. VHT-SIG-B may include different information for each spatial stream, and L-SIG and VHT-SIG-A may include identical information for each spatial stream.

Figure 5C:
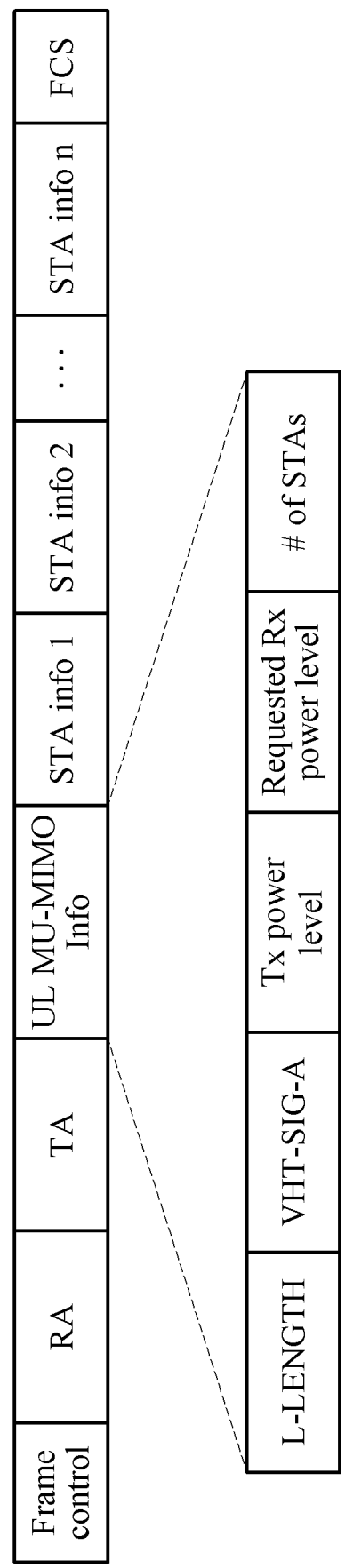
FIG. 5C is a diagram illustrating a configuration of a UL MU request frame including a VHT-signal (SIG)-A for use in a UL MU-MIMO transmission according to an example embodiment.

L-SIG may include L-LENGTH and L-DATARATE. L-DATARATE of VHT-PPDU may be fixed to be 6 mega bits per second (Mbps). Thus, a plurality of equal L-SIGs, each being identical to another may be generated based on L-LENGTH information with reference to FIG. 5A. A plurality of VHT-SIG-As, each being identical to another may be generated by incorporating VHT-SIG-A used for UL MU-MIMO transmission in the UL MU request frame, and a related configuration may be indicated with reference to FIG. 5C.

Figure 6:
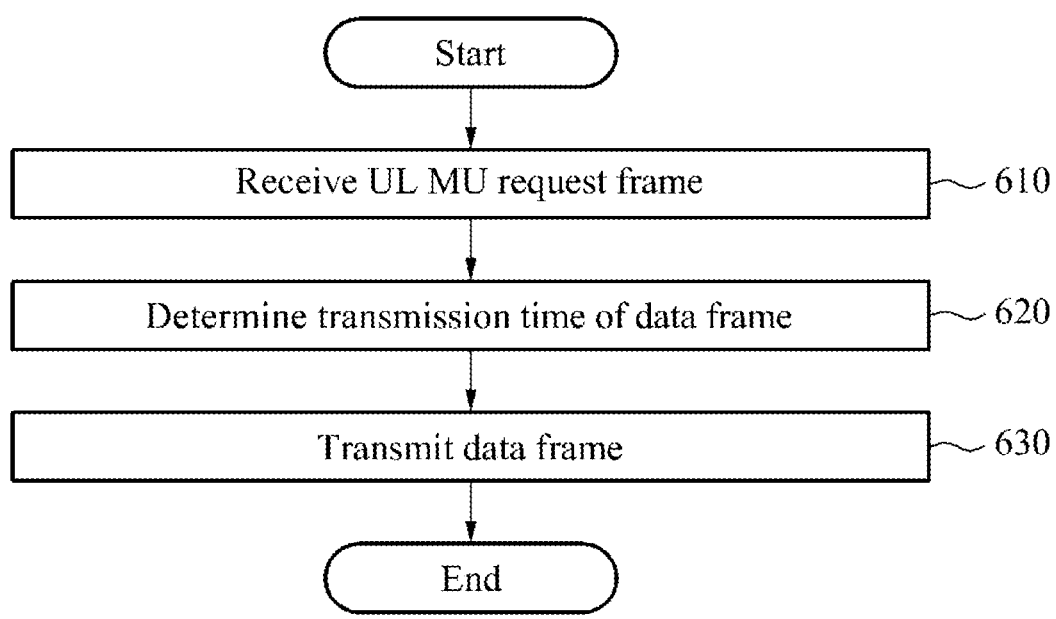
FIG. 6 is a flowchart illustrating an example of a frame transmission and reception method performed in an STA side according to an example embodiment.

FIG. 6 is a flowchart illustrating an example of a frame transmission and reception method performed in an STA side according to an example embodiment.

In operation 610, the STA may receive a UL MU request frame from an AP. The UL MU request frame may include a transmission time of a data frame.

In operation 620, the STA may determine the transmission time of the data frame based on the UL MU request frame.

In operation 630, the STA may transmit the data frame to the AP during the determined transmission time. Also, each of a plurality of STAs may transmit the data frame during an identical period of time. In response to the transmitting, the AP may receive the data frame from each of the plurality of STAs during an identical period of time, thereby stably performing a beamformed data frame transmission and reception.

Figure 7:
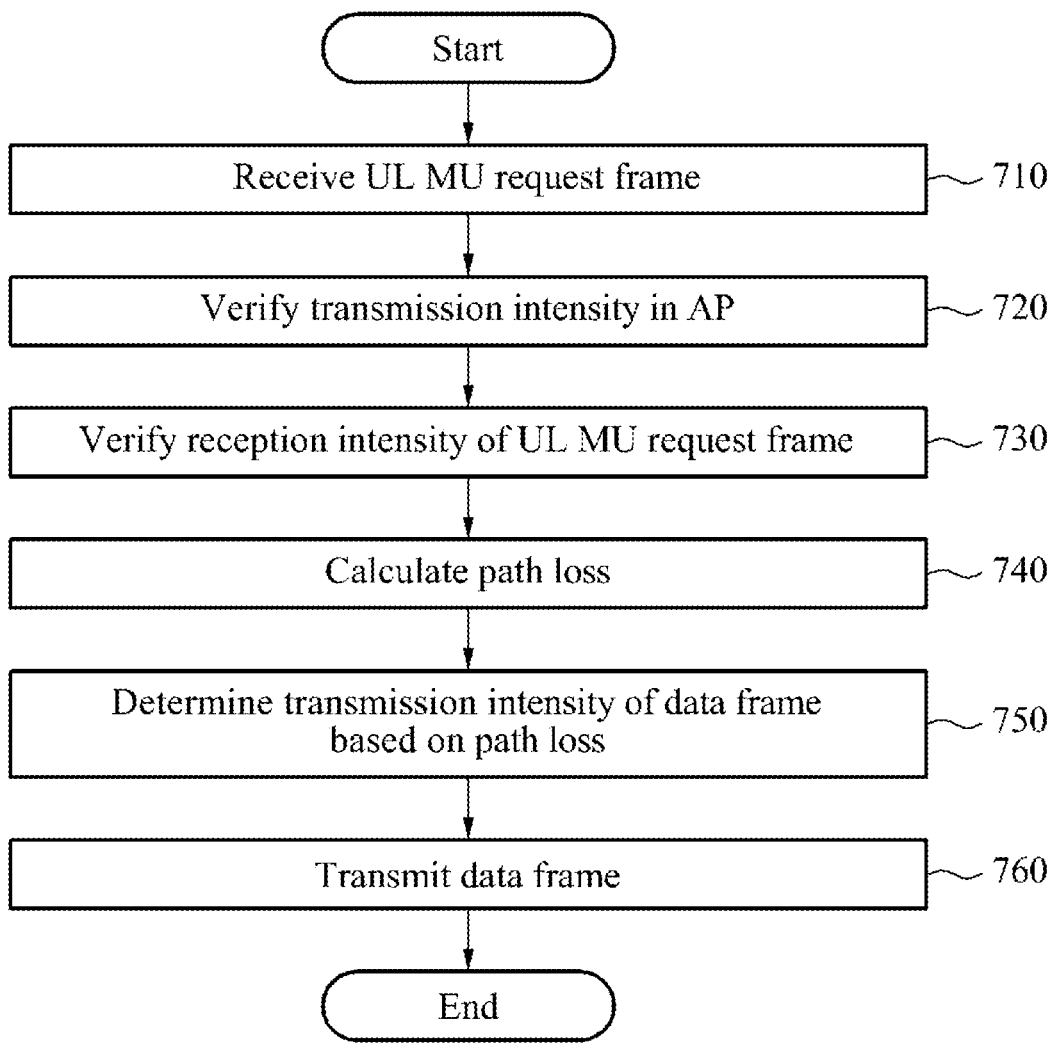
FIG. 7 is a flowchart illustrating another example of a frame transmission and reception method performed in an STA side according to an example embodiment.

FIG. 7 is a flowchart illustrating another example of a frame transmission and reception method performed in an STA side according to an example embodiment.

In operation 710, the STA may receive a UL MU request frame from an AP. The UL MU request frame may include information on a reception intensity of a data frame. For example, the UL MU request frame may include information on the reception intensity of the data frame in an AP side, and a transmission intensity of the UL MU request frame in the AP.

In operation 720, the STA may verify the transmission intensity of the UL MU request frame in the AP based on the UL MU request frame.

In operation 730, the STA may verify an actual reception intensity of the UL MU request frame.

In operation 740, the STA may calculate a path loss based on the actual reception intensity of the UL MU request frame and the transmission intensity of UL MU request frame in the AP.

In operation 750, the STA may determine a transmission intensity of the data frame based on the calculated path loss. For example, the STA may determine the transmission intensity of the data frame in the STA in consideration of the path loss and the reception intensity of the data frame in the AP.

In operation 760, the STA may transmit the data frame to the AP based on the determined transmission intensity.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of transmitting and receiving a frame for a multi-user multiple-input and multiple-output (MU-MIMO) communication in an access point (AP), the method comprising:
   transmitting, to each of a plurality of stations (STAs), an uplink multi-user request (UL MU request) frame requesting transmission of a data frame; and
   receiving, from each of the plurality of STAs, the data frame based on an identical reception intensity,
   wherein the UL MU request frame comprises a Tx power field and a Requested Rx power field, the Requested Rx power field including information on a reception intensity requested when the AP receives the data frame, and
   wherein transmission intensity of the data frame is determined based on the Requested Rx power field and path loss by each of the plurality of STAs.

2. The method of claim 1,
   wherein the Tx power field includes information on a transmission intensity of the UL MU request frame applied when the AP transmits the UL MU request frame.

3. The method of claim 2,
   wherein the path loss is calculated based on an actual reception intensity of the UL MU request frame and the information on the transmission intensity of the UL MU request frame included in the Tx power field.

4. The method of claim 1,
wherein the data frame is received during an identical period of time from each of the plurality of STAs.

5. The method of claim 1, wherein the UL MU request frame comprises identification information on each of the plurality of STAs.

6. The method of claim 5, wherein the identification information comprises at least one of media access control (MAC) address information, association identification (AID) information, and partial AID information in the Institute of Electrical and Electronics Engineers (IEEE) 802.11ac.

7. The method of claim 1, wherein the UL MU request frame further comprises information on a number of transmission STAs.

8. A method of transmitting and receiving a frame for a multi-user multiple-input and multiple-output (MU-MIMO) communication in a station (STA), the method comprising:
receiving, from an access point (AP), an uplink multi-user request (UL MU request) frame requesting transmission of a data frame;
determining a transmission intensity based on the UL MU request frame; and
transmitting, to the AP, the data frame based on the determined transmission intensity,
wherein the UL MU request frame comprises a Tx power field and a Requested Rx power field, the Requested Rx power field including information on a reception intensity requested when the AP receives the data frame, and
wherein the transmission intensity of the data frame is determined based on the Requested Rx power field and path loss.

9. The method of claim 8, wherein the Tx power field includes information on a transmission intensity of the UL MU request frame applied when the AP transmits the UL MU request frame.

10. The method of claim 9,
wherein the path loss is calculated based on an actual reception intensity of the UL MU request frame and the information on the transmission intensity of the UL MU request frame included in the Tx power field.

11. The method of claim 8,
wherein the AP receives the data frame during an identical period of time from each of a plurality of STAs.

12. The method of claim 8, wherein the UL MU request frame comprises identification information on the STA.

13. The method of claim 12, wherein the identification information comprises at least one of media access control (MAC) address information, association identification (AID) information, and partial AID information in the Institute of Electrical and Electronics Engineers (IEEE) 802.11ac.

14. An Access Point (AP) for use in a multi-user multiple-input and multiple-output (MU-MIMO) communication, the AP comprising:
a communicator;
a controller configured to control the communicator;
wherein the controller is further configured to:
cause the communicator to transmit, to each of a plurality of stations (STAs), an uplink multi-user request (UL MU request) frame requesting transmission of a data frame,
cause the communicator to receive, from each of the plurality of STAs, the data frame based on an identical reception intensity,
wherein the UL MU request frame comprises a Tx power field and a Requested Rx power field, the Requested Rx power field including information on a reception intensity requested when the AP receives the data frame, and
wherein transmission intensity of the data frame is determined based on the Requested Rx power field and path loss by each of the plurality of STAs.

* * * * *